United States Patent [19]
Ishihara et al.

[11] Patent Number: 6,116,739
[45] Date of Patent: Sep. 12, 2000

[54] COLOR PROJECTION DISPLAY APPARATUS

[75] Inventors: Jun Ishihara, Kobe; Kohtaro Hayashi, Toyonaka; Ichiro Kasai, Kawachinagano, all of Japan

[73] Assignee: Minolta Co., Ltd., Osaka, Japan

[21] Appl. No.: 09/276,778

[22] Filed: Mar. 25, 1999

[30] Foreign Application Priority Data

Mar. 26, 1998 [JP] Japan .................................. 10-079026

[51] Int. Cl.[7] .................................................. G03B 21/28
[52] U.S. Cl. ............................ 353/31; 353/37; 349/8
[58] Field of Search .............................. 353/31, 33, 34, 353/37, 98, 99; 349/5, 7, 8, 9

[56] References Cited

U.S. PATENT DOCUMENTS

| | | | |
|---|---|---|---|
| 5,633,737 | 5/1997 | Tanaka et al. | 349/95 |
| 5,726,719 | 3/1998 | Tanaka et al. | 349/8 |
| 5,737,040 | 4/1998 | Ichikawa et al. | 349/9 |
| 5,852,479 | 12/1998 | Ueda et al. | 349/9 |
| 5,859,675 | 1/1999 | Ogino | 349/5 |
| 5,897,190 | 4/1999 | Takahashi | 353/31 |
| 6,020,940 | 2/2000 | Ishikawa et al. | 349/8 |
| 6,022,110 | 2/2000 | Tsujikawa | 353/20 |

FOREIGN PATENT DOCUMENTS 9-5773  1/1997  Japan .

*Primary Examiner*—William Dowling
*Attorney, Agent, or Firm*—Sidley & Austin

[57] ABSTRACT

A color projection display apparatus has a white light source, splitting means, a reflective color display device and projecting means. The splitting means splits a white luminous flux from the white light source into a plurality of luminous fluxes of different wavelength ranges, and from which luminous fluxes corresponding to the wavelength ranges exit in different directions. The reflective color display device modulates and reflects the luminous fluxes corresponding to the wavelength ranges which luminous fluxes exit from the splitting means and are incident from different directions. The projecting means projects the luminous fluxes modulated by the reflective color display device as image light. The luminous fluxes modulated and reflected by the reflective color display device are incident on the projecting means after being again transmitted by the splitting means.

23 Claims, 10 Drawing Sheets

FIG.10A
FIG.10B
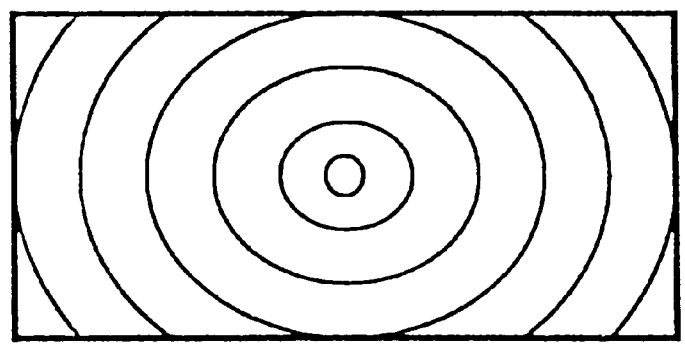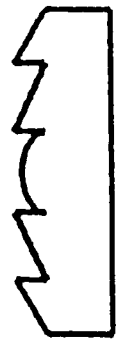
FIG.11A
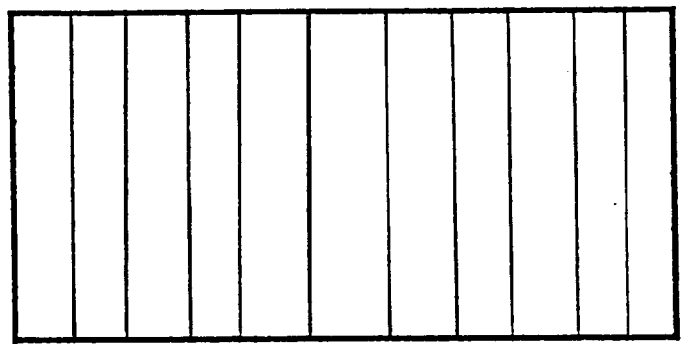
FIG.11B

FIG.12A FIG.12B
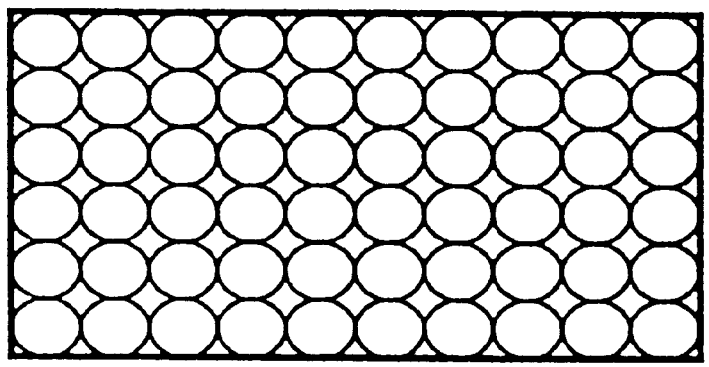
FIG.13A FIG.13B
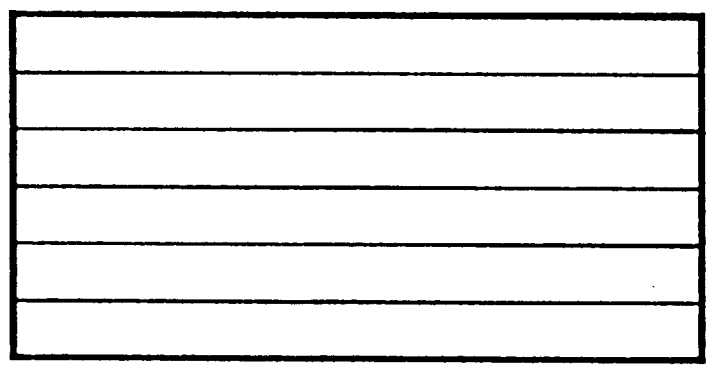

COLOR PROJECTION DISPLAY APPARATUS

This application is based on application No. H10-079026 filed in Japan, the contents of which are hereby incorporated by reference.

BACKGROUND OF THE INVENTION

1. Field of the Invention

The present invention relates to a single plate projective color display apparatus, and more particularly to a single plate projective color liquid crystal display apparatus that performs color display by use of a reflective liquid crystal display device.

2. Description of the Prior Art

Conventionally, as single-plate projective color liquid crystal display apparatuses, ones in which a white luminous flux is split into luminous fluxes of three primary colors, the luminous fluxes are applied to the same liquid crystal display device at different angles and the luminous fluxes modulated by the liquid crystal display device are projected have been disclosed as described in Japanese Laid-open Patent Application No. H9-5773 and U.S. Pat. No. 5,726, 719. Since these display apparatuses use no mosaic color filters, luminous fluxes not transmitted by the filter are never discarded and accordingly, projection can be performed with efficiency. Therefore, these display apparatuses are suitable for use in liquid crystal projectors requiring that images should be bright.

However, in these display apparatuses, since transmissive liquid crystal is used, circuits attendant on pixels of the liquid crystal are necessary, so that the aperture efficiency decreases and the brightness decreases accordingly. That is, in typically used thin-film transistor (TFT) liquid crystal, since a transistor circuit is provided for each pixel, the luminous fluxes are intercepted at the parts of the transistor circuits when passing through the liquid crystal.

SUMMARY OF THE INVENTION

An object of the present invention is to provide an improved color projection display apparatus.

Another object of the present invention is to provide an efficient color projection display apparatus.

To achieve the above-mentioned object, according to the present invention, a color projection display apparatus is provided with: a white light source; splitting means for splitting a white luminous flux from the white light source into luminous fluxes of three primary colors of red, green and blue and bending the luminous fluxes in different directions; a color display device for forming a color image by modulating the luminous fluxes made incident from different directions by the splitting means; and a projecting means for projecting the luminous fluxes modulated by the color display device. The color display device is a reflective color display device that receives the luminous fluxes from directions different among wavelength ranges and from which modulated reflected light exits. The luminous fluxes modulated and reflected by the reflective color display device are transmitted by the splitting means to reach the projecting means.

The splitting means is a prism having reflecting surfaces forming different angles, and the white luminous flux is reflected at a different reflecting surface different for each wavelength range. Further, the difference in angles at which the luminous fluxes split by the prism are incident on the reflective color display device fulfills the following conditions:

5 degrees $\leq \theta_{B-R} \leq$ 20 degrees 5 degrees $\leq \theta_{G-R} \leq$ 20 degrees where:

$\theta_{B-R}$ is the difference in angle of incidence between the luminous flux of the blue (B) range and the luminous flux of the red (R) range; and $\theta_{G-R}$ is the difference in angle of incidence between the luminous flux of the green (G) range and the luminous flux of the red (R) range.

The luminous flux incident on the prism is s-polarized light, and the reflected light modulated and reflected by the reflective color display device is p-polarized light. The wavelength ranges are three wavelength ranges of R, G and B.

A lens device for condensing the incident luminous fluxes onto pixels of the reflective color display device is disposed between the reflective color display device and the splitting means, and by combining the lens device with a material having birefringence, the lens device acts differently on the incident luminous fluxes and the luminous fluxes modulated and reflected by the reflective color display device.

A diffraction grating for reflecting the incident luminous fluxes in predetermined directions is disposed at each pixel of the reflective color display device.

The splitting means is a dichroic polarization beam splitter having three polarization beam splitter surfaces that reflect s-polarized light for each different wavelength range and substantially transmit p-polarized light of a wavelength of the visible range, and the wavelength range of the luminous flux split from the white luminous flux by the dichroic polarization beam splitter first is the red range or the blue range.

An arrangement may be employed in which the wavelength range of the luminous flux split from the white luminous flux by the dichroic polarization beam splitter first is the blue range and the wavelength range of the luminous flux split next is the red range.

The difference in angles at which the luminous fluxes split by the dichroic polarization beam splitter are incident on the lens device fulfills the following conditions:

5 degrees $\leq \theta_{B-R} \leq$ 20 degrees 5 degrees $\leq \theta_{G-R} \leq$ 20 degrees where:

$\theta_{B-R}$ is the difference in angle of incidence between the luminous flux of the blue (B) range and the luminous flux of the red (R) range; and $\theta_{G-R}$ is the difference in angle of incidence between the luminous flux of the green (G) range and the luminous flux of the red (R) range.

The reflective color display device is reflective color liquid crystal.

BRIEF DESCRIPTION OF THE DRAWINGS

This and other objects and features of this invention will become clear from the following description, taken in conjunction with the preferred embodiments with reference to the accompanied drawings in which:

FIGS. 10A and 10B are views schematically showing the configuration of the Flesnel lens;

FIGS. 11A and 11B are views schematically showing a Flesnel lens striped in the direction of the short side;

FIGS. 12A and 12B are views schematically showing the configuration of a microlens array; and FIGS. 13A and 13B are views schematically showing the configuration of a lenticular lens.

DESCRIPTION OF THE PREFERRED EMBODIMENTS

Figure 1:
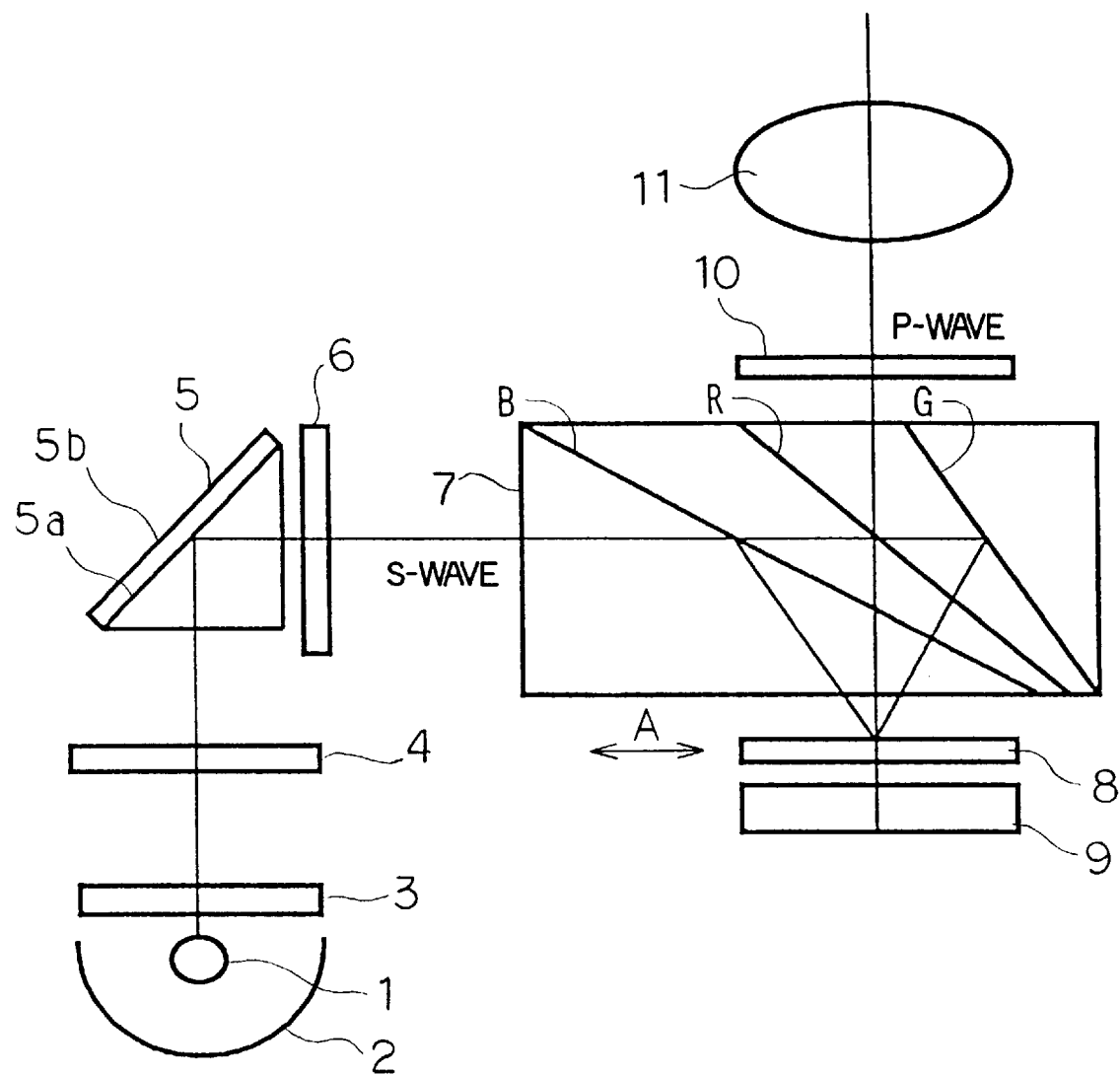
FIG. 1 is a view schematically showing the general structure of an embodiment of the present invention.

Hereinafter, an embodiment of the present invention will be described with reference to the drawings. FIG. 1 is a view schematically showing the general structure of the embodiment of the present invention. In the figure, reference numeral 1 represents a white light source, reference numeral 2 represents a reflector disposed so as to surround the white light source 1 and reflecting light from the white light source 1, reference numeral 3 represents a UV-IR cut filter disposed above the white light source 1 and intercepting the ultraviolet rays and the infrared rays included in the light from the white light source 1, reference numeral 4 represents a plate-form first lens array disposed above the UV-IR cut filter 3 and having a multiplicity of small lenses arranged on the surface thereof, reference numeral 5 represents a triangular polarization converting prism disposed above the first lens array 4 and converting the light from the white light source 1 into predetermined polarized light, and reference numeral 6 represents a plate-form second lens array disposed on the right side of the polarization converting prism 5 and having a multiplicity of small lenses on the surface thereof.

As the white light source 1, for example, a metal halide lamp is used. The first lens array 4, the polarization converting prism 5 and the second lens array 6 constitute a so-called integrator, which converts light so that light source nonuniformness is eliminated and that it looks as if there were a multiplicity of light sources.

Reference numeral 7 represents a block-form dichroic polarization beam splitter disposed on the right side of the second lens array 6 and splitting a white luminous flux from the white light source 1 into luminous fluxes of three primary colors of red (R), green (G) and blue (B). Reference numeral 8 represents a plate-form lens device disposed below the dichroic polarization beam splitter 7 and condensing the luminous fluxes from the dichroic polarization beam splitter 7. Reference numeral 9 represents reflective liquid crystal (reflective color liquid crystal) disposed below the lens device 8 and acting as a display device. Reference numeral 10 represents a polarizing plate disposed above the dichroic polarization beam splitter 7 and adjusting the polarization direction. Reference numeral 11 represents a projection optical system disposed above the polarizing plate 10 and projectively displaying the display information of the reflective liquid crystal 9.

As shown in the figure, illumination light (white luminous flux) comprising a mixture of the direct light from the white light source 1 and the reflected light from the reflector 2 is transmitted by the UV-IR cut filter 3, so that only visible light is left in the illumination light. Then, the illumination light is transmitted by the first lens array 4 and is then incident on the polarization converting prism 5. At the polarization converting prism 5, of the white luminous flux, an s-polarized component is reflected at a surface 5a and a p-polarized component is reflected at a surface 5b to exit to the second lens array 6. Since the positions where the s-polarized luminous flux and the p-polarized luminous flux are incident on the second lens array 6 are different, only the p-polarized light is converted into s-polarized light by a half wave plate so that all the luminous fluxes are s-polarized light. The illumination light transmitted by the second lens array 6 is incident on the dichroic polarization beam splitter 7 as a white luminous flux of only s-polarized light.

Of the white luminous flux of only s-polarized light incident on the dichroic polarization beam splitter 7, only the luminous flux of blue is reflected at an illustrated surface B and the other luminous fluxes are transmitted. Then, of the transmitted luminous fluxes, only the luminous flux of red is reflected at a surface R and the other luminous flux is transmitted. Then, the transmitted luminous flux, which is the luminous flux of green, is reflected at a surface G. The luminous fluxes of the three primary colors are transmitted by the lens device 8 and condensed onto pixels on the reflective liquid crystal 9. At the reflective liquid crystal 9, pixels used for display at each point of time are turned on and s-polarized light of the luminous fluxes incident on these pixels are reflected after being converted into p-polarized light, and pixels not used for display are turned off and the luminous fluxes incident on these pixels are reflected as s-polarized light.

The luminous fluxes reflected at the reflective liquid crystal 9 are again transmitted by the lens device 8 and incident on the dichroic polarization beam splitter 7, where only luminous fluxes of p-polarized light, that is, the luminous fluxes reflected at the ON pixels of the reflective liquid crystal 9 are transmitted. The transmitted luminous fluxes pass through the polarizing plate 10 to be completely adjusted into p-polarized light and are then incident on the projection optical system 11 to be image-projected. It is desirable that the luminous fluxes to be incident from the so-called integrator on the dichroic polarization beam splitter 7 should be light whose polarization direction has been adjusted into that of s-polarized light as described above.

As the dichroic polarization beam splitter 7, a splitter of three surfaces of B, R and G as shown in the figure is necessary. Such a structure is necessary in order to color-separate the illumination light into red (R), green (G) and blue (B) and to effectively direct the luminous fluxes to pixels of the colors of the reflective liquid crystal 9 with the light quantity loss being curbed as described later. A point here is that the angle of incidence on the lens device 8 differs among the colors. This will be detailed later.

While in this embodiment, the order of reflection of the colors at the dichroic polarization beam splitter 7 is from the incidence side (illumination light side) B→R→G, the order is not limited thereto. That is, the order may be from the incidence side R→G→B, R→B→G or B→G→R. However, since the metal halide lamp used as the material for the white light source 1 is weak in the intensity of red, in this case, it is desirable that the order of reflection of red (R) should be the middle as in this embodiment in order to eliminate the influence of eclipse caused in the periphery of the lens elements of the projection optical system 11.

A coating that allows the surface to act as a polarization beam splitter (dichroic coating) is applied to each of the surfaces R, G and B as described later. Since the wavelength range of the luminous flux when the s-polarized light of green (G) is reflected is comparatively wide, it is undesirable that the surface G should be the first surface on the incidence side because part of red (R) or blue (B) is reflected together with green (G) according to the setting of the wavelength range of the light to be reflected.

As to the disposition of the reflective liquid crystal 9 as a panel, it is desirable that the direction shown by the arrow A of FIG. 1 should be the short side and the direction vertical to the plane of the figure should be the long side. With this disposition, the volume of the dichroic polarization beam splitter 7 can be reduced. In addition, the lens back focal length from the reflective liquid crystal 9 to the projection optical system 11 can be reduced. Consequently, the size of the projection optical system can be reduced. The polarizing plate 10 transmitting p-polarized light is unnecessary in principle. However, by using this, the contrast of the projected images can be increased.

Figure 2:
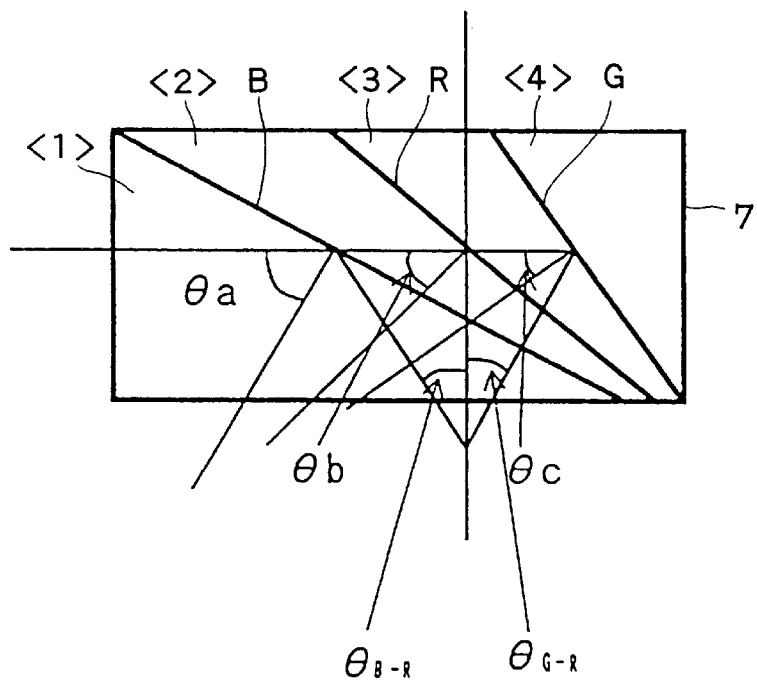
FIG. 2 is a view schematically showing the structure of a dichroic polarization beam splitter.

FIG. 2 is a view schematically showing the structure of the dichroic polarization beam splitter 7. As shown in the figure, the dichroic polarization beam splitter 7 comprises four glass prisms <1> to <4> cemented to one another. Coated surfaces are formed between the glass prisms <1> and <2>, <2> and <3>, and <3> and <4>. By associating these surfaces with the surfaces B, R and G, the luminous fluxes of s-polarized light of the colors are reflected to perform color separation.

In FIG. 2, the incidence angles of the illumination light incident from the left in the figure on the coated surfaces B, R and G formed between the glass prisms <1> and <2>, <2> and <3>, and <3> and <4> are represented by $\theta a$, $\theta b$ and $\theta c$, respectively. When the angle of intersection of the reflected light beams from the surfaces B and R is $\theta_{B-R}$ and the angle of intersection of the reflected light beams from the surfaces G and R is $\theta_{G-R}$, these are the angles at which the light beams reflected from the surfaces B and G are incident on the lens device 8 (and by extension, on the reflective liquid crystal 9 acting as a display device). The angle at which the reflected light from the surface R is incident on the lens device 8 is substantially zero degree.

Figure 3:
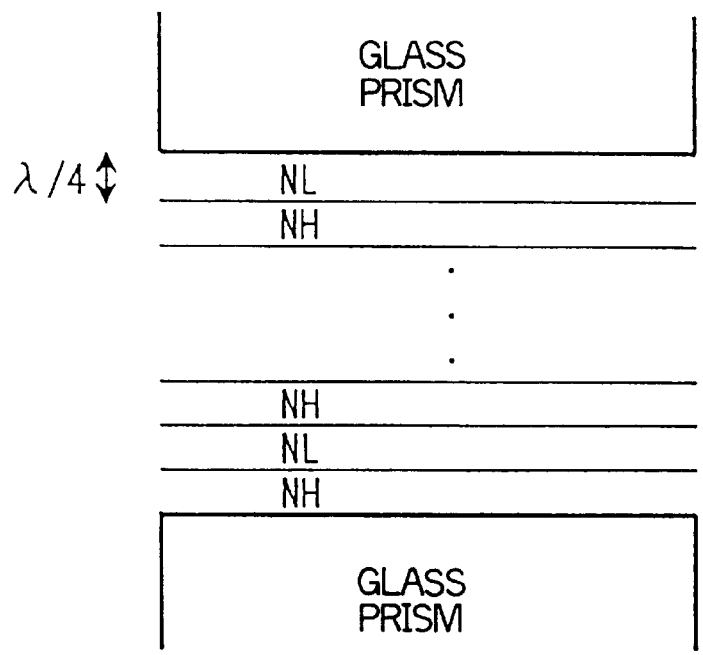
FIG. 3 is a view of assistance in explaining the film structure of coated surfaces of glass prisms.

The relationship among the angles in this embodiment is as shown in Table 1. When the angles $\theta_{B-R}$ and $\theta_{G-R}$ are set as shown in this table, the angles of incidence on the coated surfaces are the corresponding $\theta a$, $\theta b$ and $\theta c$. When the angles $\theta_{B-R}$ and $\theta_{G-R}$ are larger than these angles, it is difficult to condense the luminous fluxes reflected from the reflective liquid crystal 9, so that it is necessary to increase the diameter of the projection optical system 11. When the angles are too small, color separation cannot sufficiently be performed. Therefore, the optimum ranges of the angles of incidence on the lens device 8 (display device) are as follows:

5 degrees$\leq \theta B-R \leq$20 degrees 5 degrees$\leq \theta G-R \leq$20 degrees The film structure of the coated surfaces formed between the glass prisms <1> and <2>, <2> and <3>, and <3> and <4> is as shown in FIG. 3. The film structure that effectively reflects s-polarized light at the angles $\theta a$, $\theta b$ and $\theta c$ of incidence on the coated surfaces shown in Table 1 and transmits p-polarized light is as shown in Table 2 (angles at which s-polarized light is reflected and the film structure thereof). Assume now that the refractive index of the glass is 1.62. The coated surfaces are obtained by laminating a high refractive index material (NH) and a low refractive index material (NL) as shown in FIG. 3 in the structure as shown in the table for each of the angles $\theta$.

Here, $\lambda$ represents the design wavelength. In the range of blue (B), a wavelength of approximately 400 to 500 nm is appropriately selected, in the range of green (G), a wavelength of approximately 500 to 600 nm is appropriately selected, in the range of red (R), a wavelength of approximately 600 to 700 nm is appropriately selected, and lamination is made with a thickness of ¼ wavelength. Excellent polarization separation is obtained when the incidence angles $\theta a$, $\theta b$ and $\theta c$ coincide with any of the values of $\theta$ in Table 2. Typically, approximately 20 layers are laminated in order to perform excellent polarization separation and color separation.

Figure 4:
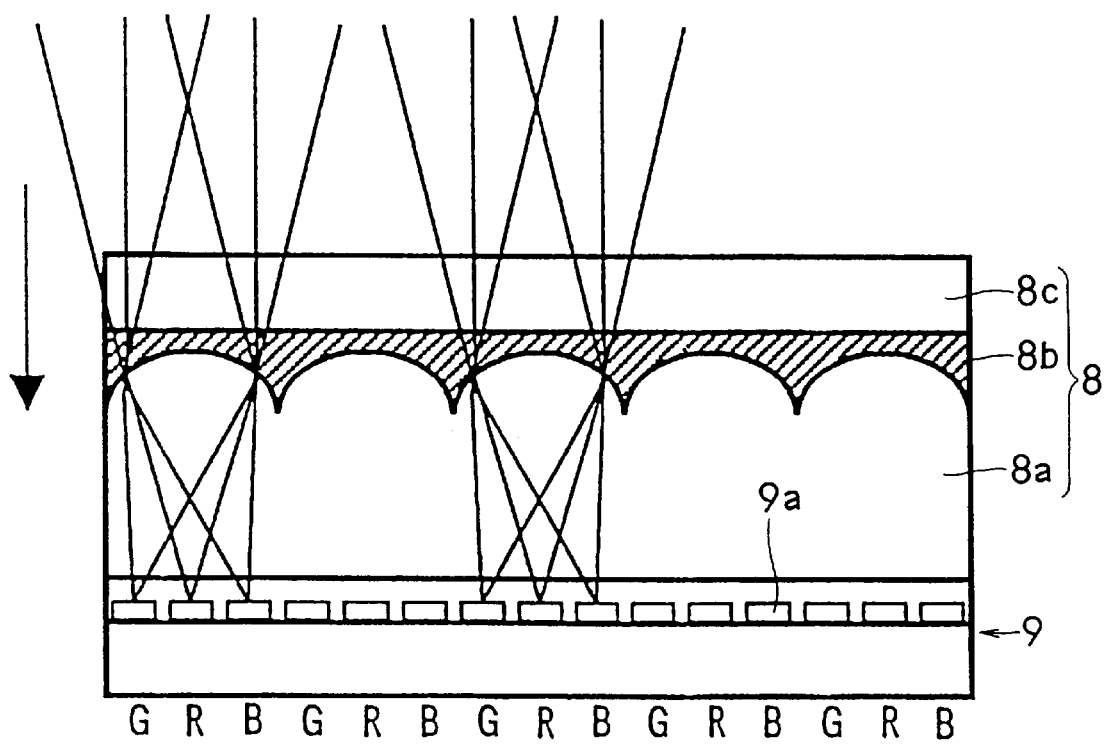
FIG. 4 is a view schematically showing an example of the structure of a lens device and reflective liquid crystal.

FIG. 4 is a view schematically showing an example of the structure of the lens device 8 and the reflective liquid crystal 9, and shows an incidence condition of the illumination light (in FIGS. 4 to 9, the direction along the plane of the figure is the short side and the direction vertical to the plane of the figure is the long side). As shown in FIG. 4, as an element of the lens device 8, a microlens array 8a where a multiplicity of small lenses of the order of several tens of micrometers are arranged on the surface thereof is disposed immediately in front of the reflective liquid crystal 9, and a material 8b having birefringence such that the refractive index differs according to the direction of transmitted polarized light is provided on the top surface of the microlens array 8a. The element 8c disposed on the material 8b is a protective transparent plate made of glass. The microlens array 8a may be a subsequently-described lenticular lens.

Assuming now that the illumination light having been color-separated into the three primary colors is incident on the lens device 8 from the direction shown by the arrow in the figure, since the illumination light is s-polarized light, as schematically shown by the oblique lines, the material 8b having birefringence acts on the s-polarized light as a material having a different refractive index from that of the microlens array 8a. With the workings of the elements 8a and 8b being combined, the luminous fluxes are condensed onto pixels 9a of the reflective liquid crystal 9 that are arranged so as to reflect desired colors of R, G and B. By doing so, the light loss is eliminated to thereby make the images bright.

As the material having birefringence, liquid crystal is the most suitable. Liquid crystal in which the orientation thereof is controlled by orientation processing is disposed. A material such as UV-curable liquid crystal may be used which is cured by applying ultraviolet rays at the point of time when the orientation of the liquid crystal becomes the desired one electrically or by orientation processing.

Figure 5A:
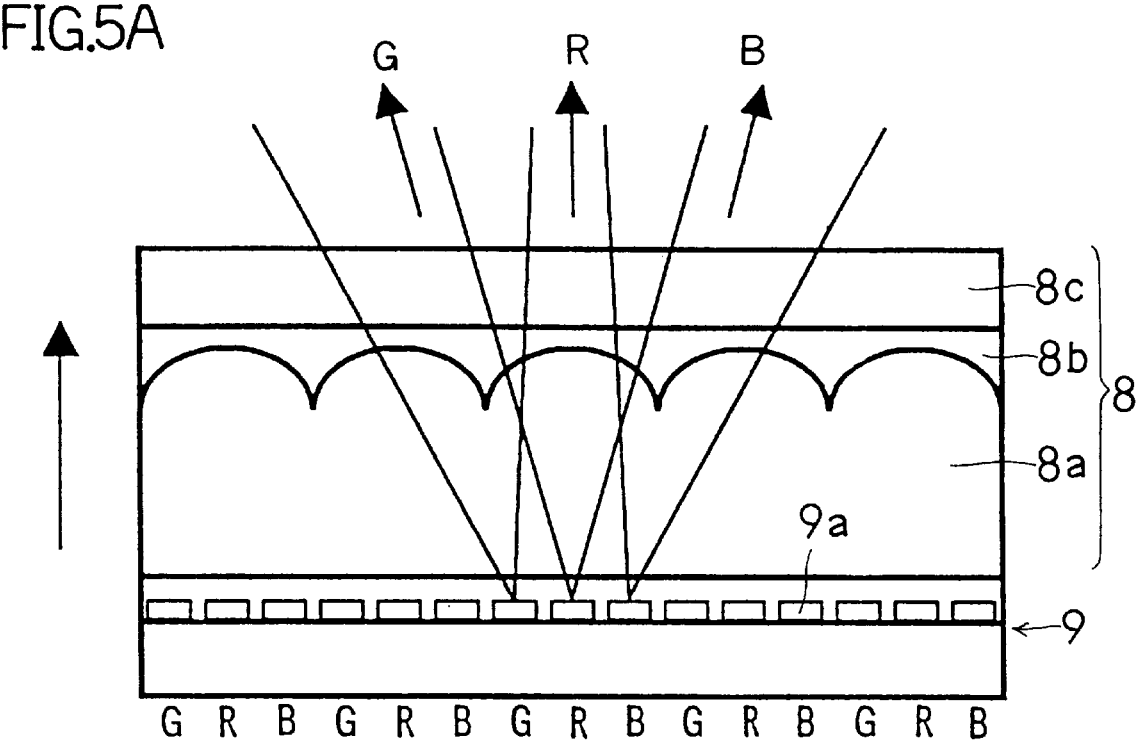
FIGS. 5A and 5B are views showing an exit condition of illumination light reflected from the reflective liquid crystal.
Figure 5B:
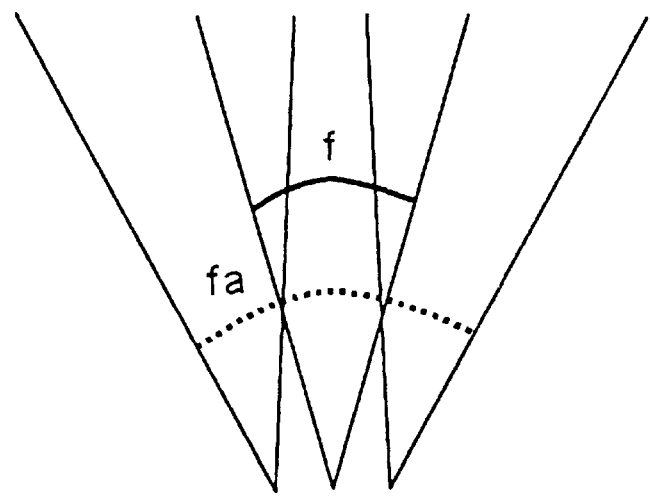

FIGS. 5A and 5B show an exit condition of the illumination light reflected from the reflective liquid crystal 9 in the same structure as that shown in FIG. 4. As shown in FIG. 5A, assuming now that the luminous fluxes of R, G and B exit from the pixels 9a of the reflective liquid crystal 9 in the directions shown by the arrows, the luminous fluxes used for the image have been converted from s-polarized light into p-polarized light by the reflective liquid crystal 9 and the material 8b having birefringence acts on the p-polarized light as a material having the same refractive index as that of the microlens array 8a. At this time, since the lens device 8 is equivalent to a material being entirely uniform and having the same refractive index, it never occurs that the image is disturbed by the exiting luminous fluxes being affected by the microlens array 8a.

However, in this embodiment, as shown in FIG. 5B showing only the reflected luminous fluxes, although the F numbers of the reflected luminous fluxes of R, G and B are the same as shown as an angle f by the solid line in the figure with the F number of R as the representative, since the direction in which the principal ray exit differs among R, G and B, the luminous fluxes exit with a spread more than the F numbers thereof as shown as an angle fa by the dotted line in the figure. Since the luminous fluxes of G and B exit so as to spread toward both sides with respect to the luminous flux of R, it is necessary to correct this and to reduce the F number of the projection optical system 11 (that is, to make the optical system brighter).

Figure 6:
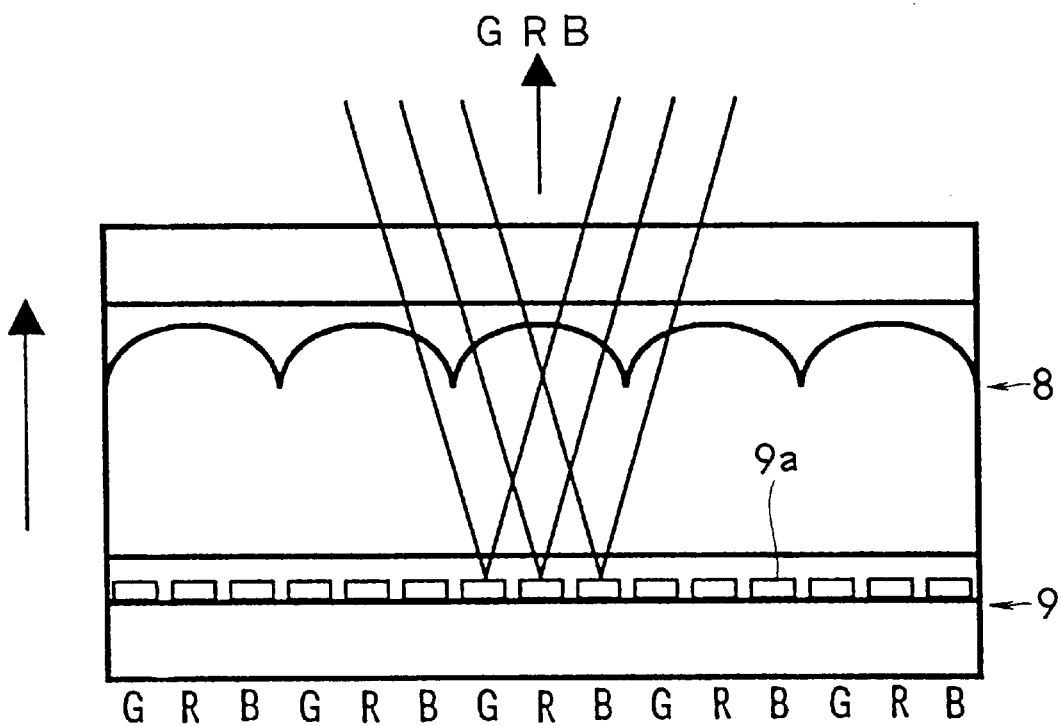
FIG. 6 is a view showing an exit condition of the illumination light when DOE (diffraction grating) is disposed in the reflective liquid crystal.

Therefore, in order that the principal rays of G and B are oriented in the same direction as the principal ray of R as shown by the arrow as shown in FIG. 6, a non-illustrated DOE (diffraction grating) is disposed in the reflecting portion of each of the pixels 9a of the reflective liquid crystal 9 at which G and B are reflected, whereby the projection optical system 11 can be reduced in size. Here, of the pixels 9a, the ones at which the luminous flux of R is reflected is not necessarily provided with the DOE.

Figure 7B:
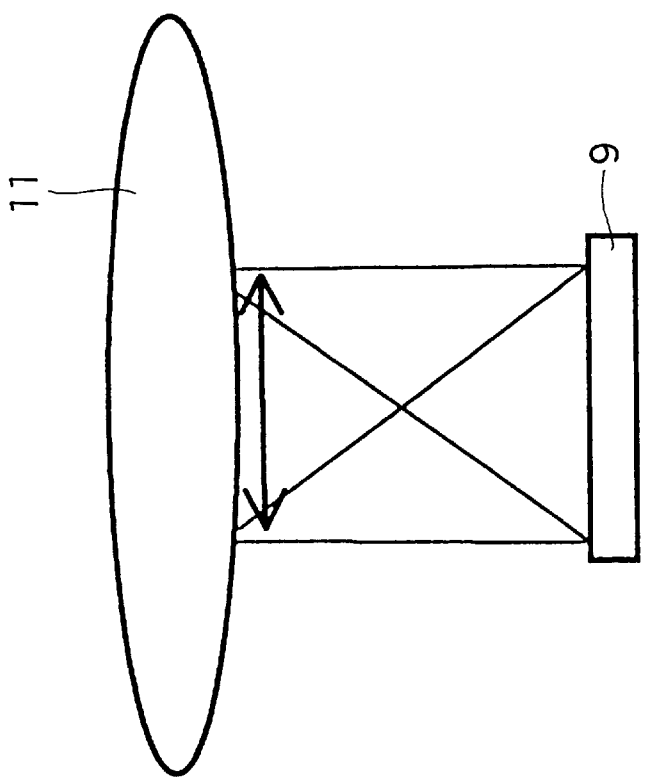
FIGS. 7A and 7B are schematic views of assistance in explaining a condenser lens function of the reflective liquid crystal.
Figure 7A:
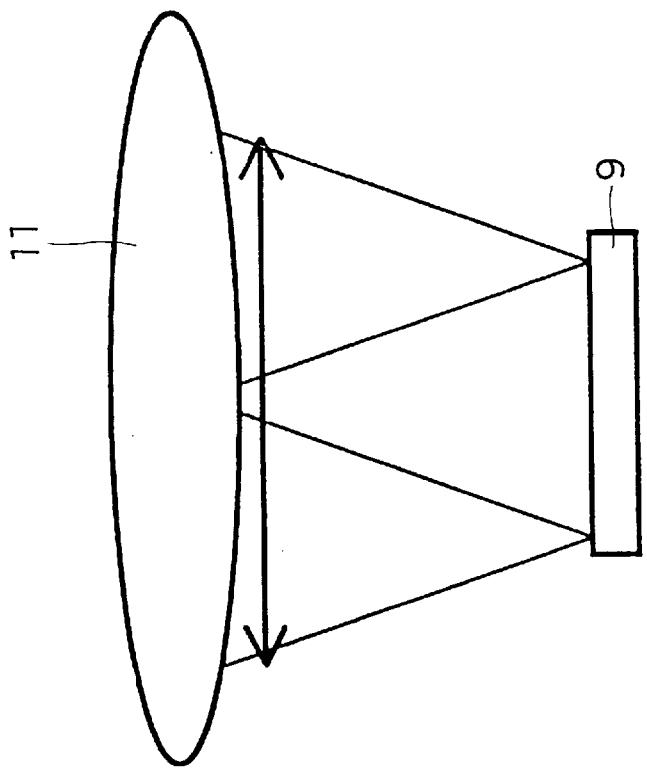

Moreover, by varying the configurations of the DOE among pixels and disposing the DOE so that the strength of light diffraction increases toward the periphery of the plane of the reflective liquid crystal 9, a condenser lens function can be given to the reflective liquid crystal 9. FIGS. 7A and 7B are schematic views of assistance in explaining the function of the condenser lens. As shown in FIG. 7A, when the reflective liquid crystal 9 has no condenser lens function, since the reflected luminous fluxes reach the projection optical system 11 with a considerable spread as shown by the arrow, the diameter of the projection optical system 11 increases to some extent in order to condense them.

On the contrary, as shown in FIG. 7B, when the reflective liquid crystal 9 has a condenser lens function, since the luminous fluxes reach the projection optical system 11 with the spread being restrained as shown by the arrow, the diameter of the projection optical system 11 may be small, so that the size of the projection optical system 11 is further reduced.

Figure 8:
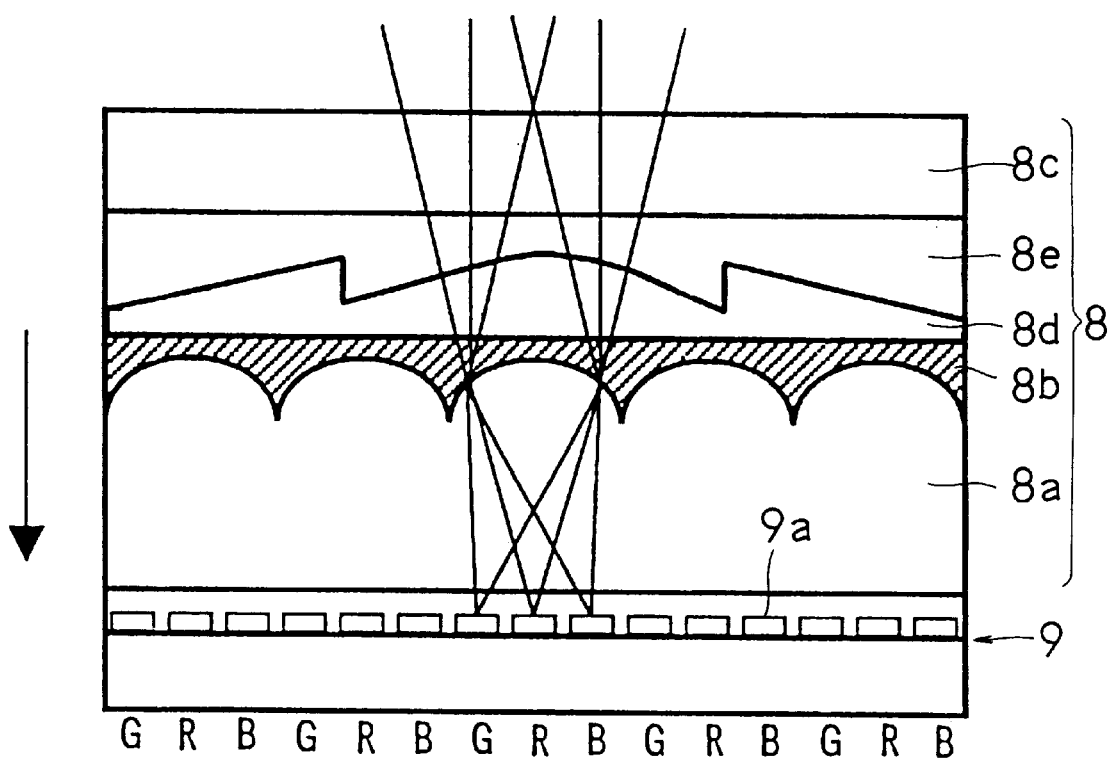
FIG. 8 is a view schematically showing another example of the structure of the lens device and the reflective liquid crystal.

FIG. 8 is a view schematically showing another example of the structure of the lens device 8 and the reflective liquid crystal 9, and shows an incidence condition of the illumination light. As shown in the figure, as an element of the lens device 8, a microlens array 8a where a multiplicity of small lenses of the order of several tens of micrometers are arranged on the surface thereof is disposed immediately in front of the reflective liquid crystal 9, and a material 8b having birefringence such that the refractive index differs according to the direction of transmitted polarized light is provided on the top surface of the microlens array 8a.

A Flesnel lens 8d is disposed on the material 8b, and another material 8e having birefringence such that the refractive index differs according to the direction of transmitted polarized light is provided on the top surface of the Flesnel lens 8d. The element 8c disposed thereon is a protective transparent plate made of glass. The microlens array 8a may be the subsequently described lenticular lens.

Assuming now that the illumination light having been color-separated into the three primary colors is incident on the lens device 8 from the direction shown by the arrow in FIG. 8, since the illumination light is s-polarized light, the material 8e having birefringence acts on the s-polarized light as a material having the same refractive index as that of the Flesnel lens 8d, and these become equivalent to a uniform material. Further, as schematically shown by the oblique lines, the material 8b having birefringence acts on the s-polarized light as a material having a different refractive index from that of the microlens array 8a. With the workings of the elements 8a and 8b being combined, the luminous fluxes are condensed onto pixels 9a of the reflective liquid crystal 9 that are arranged so as to reflect desired colors of R, G and B. By doing so, the light loss is eliminated to thereby make the images bright.

Figure 9A:
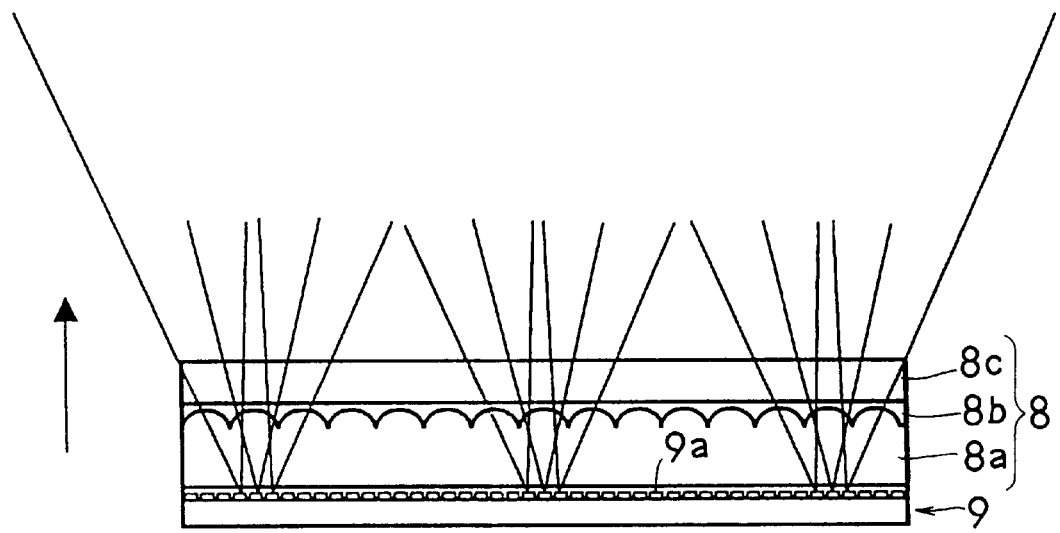
FIGS. 9A and 9B are views comparing the exit condition of the illumination light between the presence and the absence of a Flesnel lens.
Figure 9B:
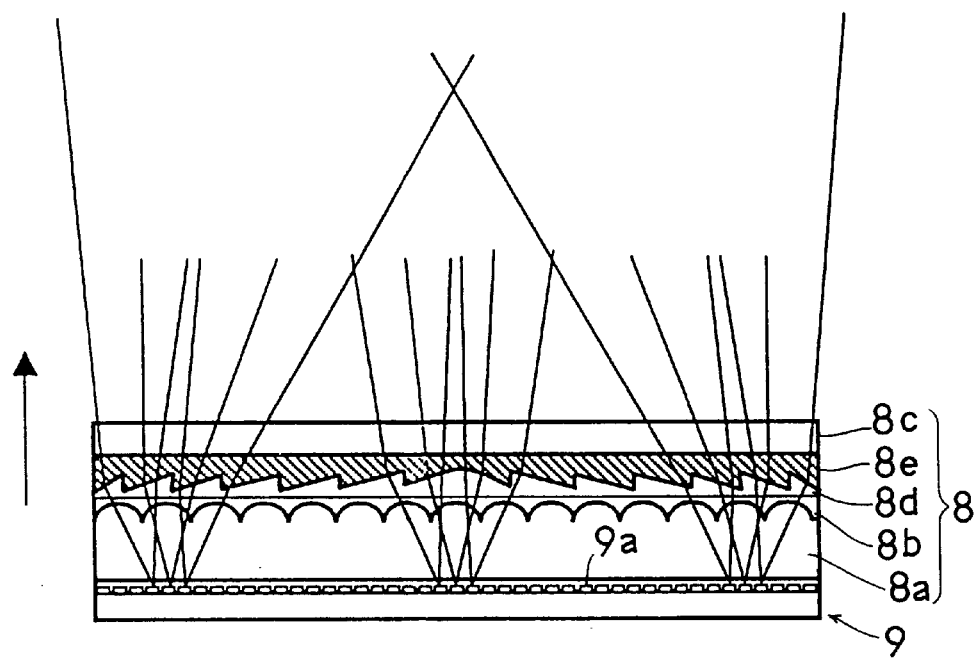

FIGS. 9A and 9B schematically show, over the entire short side length, an exit condition of the illumination light reflected from the reflective liquid crystal 9. In FIG. 9A showing a case in which the Flesnel lens is absent, the same condition as that described in FIGS. 5A and 5B is shown for the whole of the reflective liquid crystal 9. FIG. 9B shows a case in which the Flesnel lens is present.

As shown in FIG. 9B, assuming now that the luminous fluxes of R, G and B (not shown) exit from the pixels 9a of the reflective liquid crystal 9 in the direction shown by the arrow, the luminous fluxes used for the image have been converted from s-polarized light into p-polarized light by the reflective liquid crystal 9 and the material 8b having birefringence acts on the p-polarized light as a material having the same refractive index as that of the microlens array 8a. At this time, as in the case of FIGS. 5A and 5B, it never occurs that the image is disturbed by the exiting luminous fluxes being affected by the microlens array 8a.

As schematically shown by the oblique lines, the material 8e having birefringence acts on the p-polarized light as a material having a different refractive index from that of the Flesnel lens 8d. With the workings of the elements 8d and 8e being combined, the reflective liquid crystal 9 functions as a condenser lens, so that the exiting luminous fluxes reach the non-illustrated projection optical system 11 with the spread being restrained. Consequently, the diameter of the projection optical system 11 that condenses the luminous fluxes may be small. As a result, the size of the projection optical system 11 is reduced.

FIGS. 10A and 10B are views schematically showing the configuration of the Flesnel lens 8d. FIG. 10A is a plan view. FIG. 10B is a side longitudinal cross-sectional view. The surface of a Flesnel lens typically has a zonal configuration with the center of the image plane as the center. When a Flesnel lens is used in this embodiment, since the principal rays of the reflected luminous fluxes passing therethrough are not always parallel to the optical axis of the projection optical system 11, this sometimes affects the image quality. In such a case, although not directly related to the present invention, there are occasions when it is preferable only to restrain the spread of the luminous fluxes in the direction of the long side by using a Flesnel lens striped only in the direction of the short side as shown in the plan view of FIG. 11A and the front longitudinal cross-sectional view of FIG. 11B.

FIGS. 12A and 12B are views schematically showing the configuration of the microlens array 8a. FIG. 12A is a plan view. FIG. 12B is a side longitudinal cross-sectional view. A microlens array typically has a plate form where a multiplicity of small lenses of the order of several tens of micrometers are arranged on the surface thereof as shown in the figure. In this embodiment, the microlens array 8a may be a striped lenticular lens having a color separation effect only in one direction as shown in the plan view of FIG. 13A and the side longitudinal view of FIG. 13B. It is to be understood that in this case, the direction of color separation should coincide with the direction in which the luminous fluxes spread by the color separation.

Obviously, many modifications and variations of the present invention are possible in light of the above teachings. It is therefore to be understood that within the scope of the appended claims, the invention may be practiced other than as specifically described.

TABLE 1

| $\theta_{B-R}$ | $\theta_{G-R}$ | $\theta a$ | $\theta b$ | $\theta c$ |
|---|---|---|---|---|
| 5 | 5 | 47.5 | 45 | 42.5 |
| 10 | 10 | 50.0 | 45 | 40 |
| 15 | 13.25 | 52.5 | 45 | 38.4 |

TABLE 2

| | Refractive Index | | Material Name | |
|---|---|---|---|---|
| $\theta$ | NH | NL | NH | NL |
| 38.4 | 1.465 | 1.385 | $SiO_2$ | $MgF_2$ |
| 40 | 1.62 | 1.385 | $Al_2O_3$ | $MgF_2$ |
| 45 | 2.05 | 1.385 | $ZrO_2$ | $MgF_2$ |
| 50 | 2.3 | 1.465 | $TiO_2$ | $SiO_2$ |
| 51.25 | 2.05 | 1.62 | $ZrO_2$ | $Al_2O_3$ |
| 52.5 | 2.1 | 1.62 | $ZrTiO_4$ | $Al_2O_3$ |

What is claimed is:

1. A color projection display apparatus comprising:
   a white light source;
   splitting means for splitting a white luminous flux from the white light source into a plurality of luminous fluxes of different wavelength ranges, and from which luminous fluxes corresponding to the wavelength ranges exit in different directions;
   a reflective color display device for modulating and reflecting the luminous fluxes corresponding to the wavelength ranges which luminous fluxes exit from the splitting means and are incident from different directions; and
   projecting means for projecting the luminous fluxes modulated by the reflective color display device as image light,
   wherein the luminous fluxes modulated and reflected by the reflective color display device are incident on the projecting means after being transmitted through the splitting means.

2. A color projection display apparatus as claimed in claim 1,
   wherein said splitting means has reflecting surfaces forming different angles with a predetermined plane.

3. A color projection display apparatus as claimed in claim 2,
   wherein said splitting means is a prism having reflecting surfaces forming said different angles.

4. A color projection display apparatus as claimed in claim 2, wherein said splitting means splits the white luminous flux from the white light source into three primary colors of red (R), green, (G) and blue (B), and
   wherein a difference in angles at which the luminous fluxes are incident on the reflecting surfaces of the splitting means fulfills the following conditions:

5 degrees $\leq \theta_{B-R} \leq$ 20 degrees 5 degrees $\leq \theta_{G-R} \leq$ 20 degrees where:
   $\theta_{B-R}$ is a difference in angle of incidence on the reflecting surfaces of the splitting means between a luminous flux of a blue range and a luminous flux of a red range; and
   $\theta_{G-R}$ is a difference in angle of incidence on the reflecting surfaces of the splitting means between a luminous flux of a green range and the luminous flux of the red range.

5. A color projection display apparatus as claimed in claim 1,
   wherein said white luminous flux incident on the reflective color display device is s-polarized light, and light reflected from the reflective color display device is p-polarized light.

6. A color projection display apparatus as claimed in claim 1, further comprising a lens device for condensing the white luminous flux onto pixels of the reflective color display device, said lens device being disposed between the reflective color display device and the splitting means,
   wherein said lens device acts differently on the luminous fluxes incident on the reflective color display device and on the luminous fluxes reflected from the reflective color display device.

7. A color projection display apparatus as claimed in claim 6,
   wherein said lens device is made of a material having birefringence.

8. A color projection display apparatus as claimed in claim 1, further comprising a diffraction optical device for reflecting in predetermined directions a plurality of luminous fluxes incident in a vicinity of a reflecting surface of the reflective color display device.

9. A color projection display apparatus as claimed in claim 1,
   wherein said splitting means is a dichroic polarization beam splitter having three polarization beam splitter surfaces that reflect s-polarized light for each of the different wavelength ranges and transmit p-polarized light of a wavelength of a visible range.

10. A color projection display apparatus as claimed in claim 9,
    wherein a wavelength range split by the polarization beam splitter first is either a blue range or a red range.

11. A color projection display apparatus as claimed in claim 9,
    wherein a wavelength range split by the polarization beam splitter first is a blue range and a wavelength range split next is a red range.

12. A color display projecting method comprising the steps in which:
    splitting means splits a white luminous flux from a white light source into a plurality of luminous fluxes of different wavelength ranges, and luminous fluxes corresponding to the wavelength ranges exit in different directions;
    a reflective color display device modulates and reflects the luminous fluxes corresponding to the wavelength ranges which luminous fluxes exit from the splitting means and are incident from different directions; and
    projecting means projects the luminous fluxes modulated by the reflective color display device as image light,
    wherein the luminous fluxes modulated and reflected by the reflective color display device are incident on the projecting means after being transmitted through the splitting means.

13. A color display apparatus comprising:

a white light source:

splitting means for splitting a white luminous flux from the white light source into a plurality of luminous fluxes of different wavelength ranges, and from which luminous fluxes corresponding to the wavelength ranges exit in different directions; and a reflective color display device for modulating and reflecting the luminous fluxes corresponding to the wavelength ranges which luminous fluxes exit from the splitting means and are incident from different directions, wherein the luminous fluxes modulated and reflected by the reflective color display device are transmitted through the splitting means.

14. A color display apparatus as claimed in claim 13, wherein said splitting means has reflecting surfaces forming different angles with a predetermined plane.

15. A color display apparatus as claimed in claim 14, wherein said splitting means is a prism having reflecting surfaces forming said different angles.

16. A color display apparatus as claimed in claim 14, wherein said splitting means splits the white luminous flux from the white light source into three primary colors of red (R), green, (G) and blue (B), and wherein a difference in angles at which the luminous fluxes are incident on the reflecting surfaces of the splitting means fulfills the following conditions:

5 degrees $\leq \theta_{B-R} \leq$ 20 degrees 5 degrees $\leq \theta_{G-R} \leq$ 20 degrees where:

$\theta_{B-R}$ is a difference in angle of incidence on the reflecting surfaces of the splitting means between a luminous flux of a blue range and a luminous flux of a red range; and $\theta_{G-R}$ is a difference in angle of incidence on the reflecting surfaces of the splitting means between a luminous flux of a green range and the luminous flux of the red range.

17. A color display apparatus as claimed in claim 13, wherein said white luminous flux incident on the reflective color display device is s-polarized light, and light reflected from the reflective color display device is p-polarized light.

18. A color display apparatus as claimed in claim 13, further comprising a lens device for condensing the white luminous flux onto pixels of the reflective color display device, said lens device being disposed between the reflective color display device and the splitting means, wherein said lens device acts differently on the luminous fluxes incident on the reflective color display device and on the luminous fluxes reflected from the reflective color display device.

19. A color display apparatus as claimed in claim 18, wherein said lens device is made of a material having birefringence.

20. A color display apparatus as claimed in claim 13, further comprising a diffraction optical device for reflecting in predetermined directions a plurality of luminous fluxes incident in a vicinity of a reflecting surface of the reflective color display device.

21. A color display apparatus as claimed in claim 13, wherein said splitting means is a dichroic polarization beam splitter having three polarization beam splitter surfaces that reflect s-polarized light for each of the different wavelength ranges and transmit p-polarized light of a wavelength of a visible range.

22. A color display apparatus as claimed in claim 21, wherein a wavelength range split by the polarization beam splitter first is either a blue range or a red range.

23. A color display apparatus as claimed in claim 21, wherein a wavelength range split by the polarization beam splitter first is a blue range and a wavelength range split next is a red range.

* * * * *